Feb. 6, 1962 D. W. BEEM ETAL 3,020,011
EJECTION SEAT
Filed July 21, 1960 3 Sheets-Sheet 1
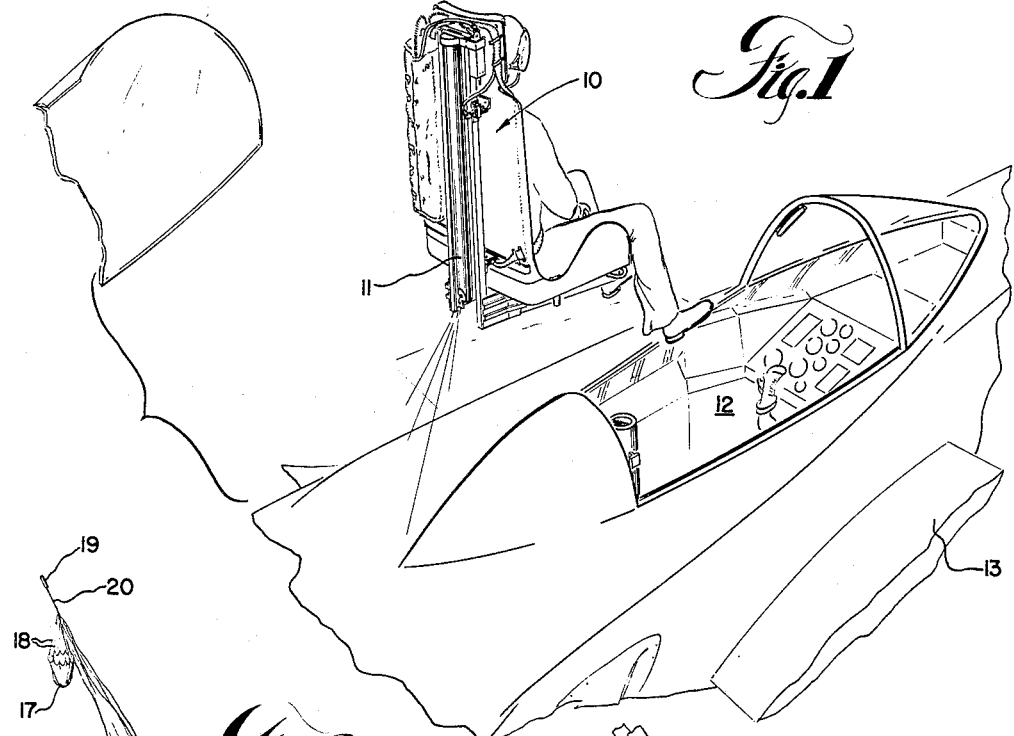
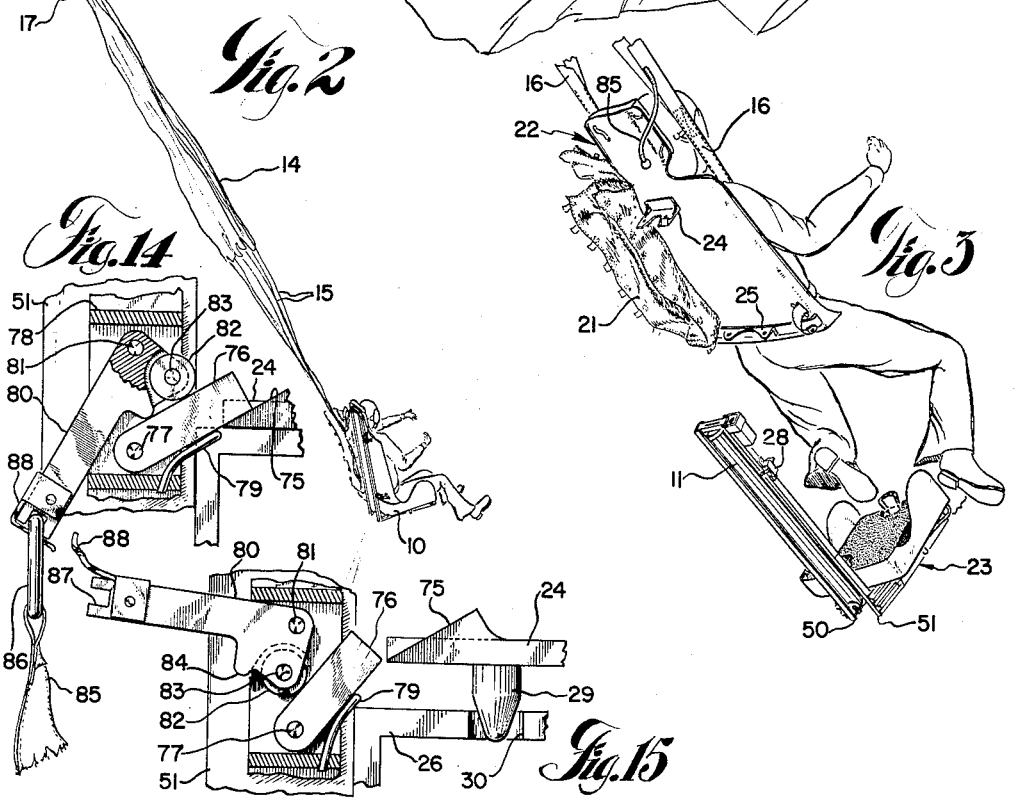

Feb. 6, 1962 D. W. BEEM ETAL 3,020,011
EJECTION SEAT
Filed July 21, 1960 3 Sheets-Sheet 2
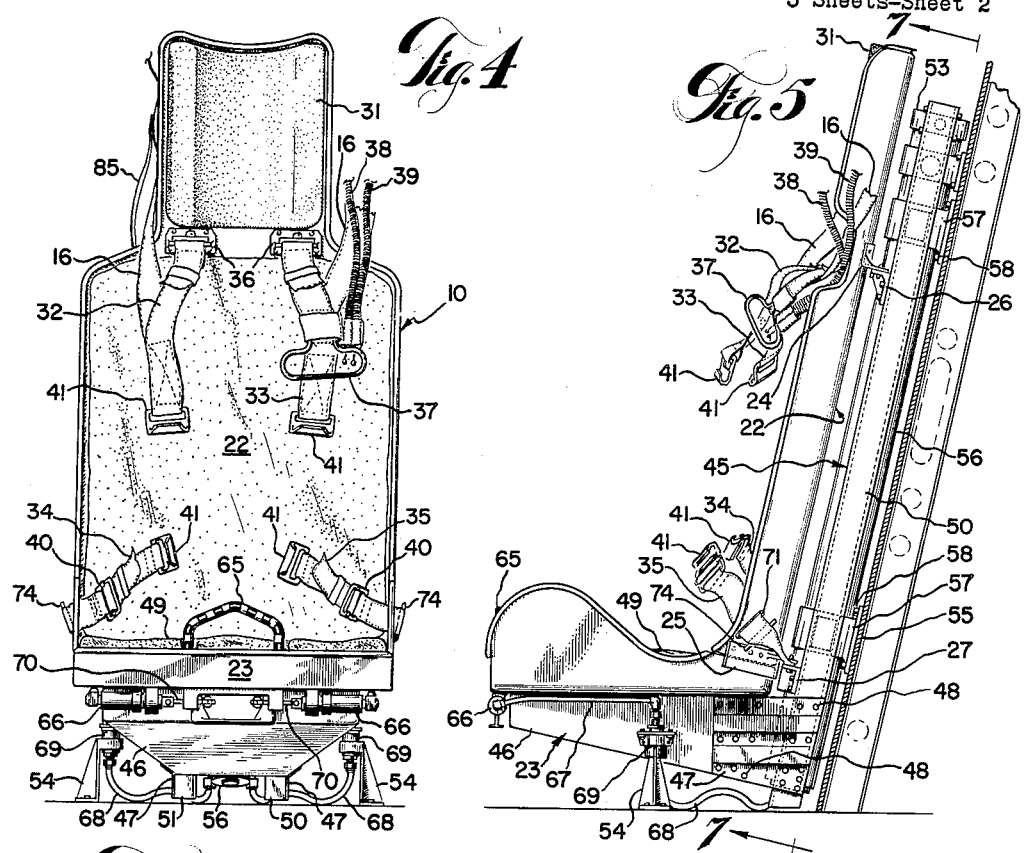
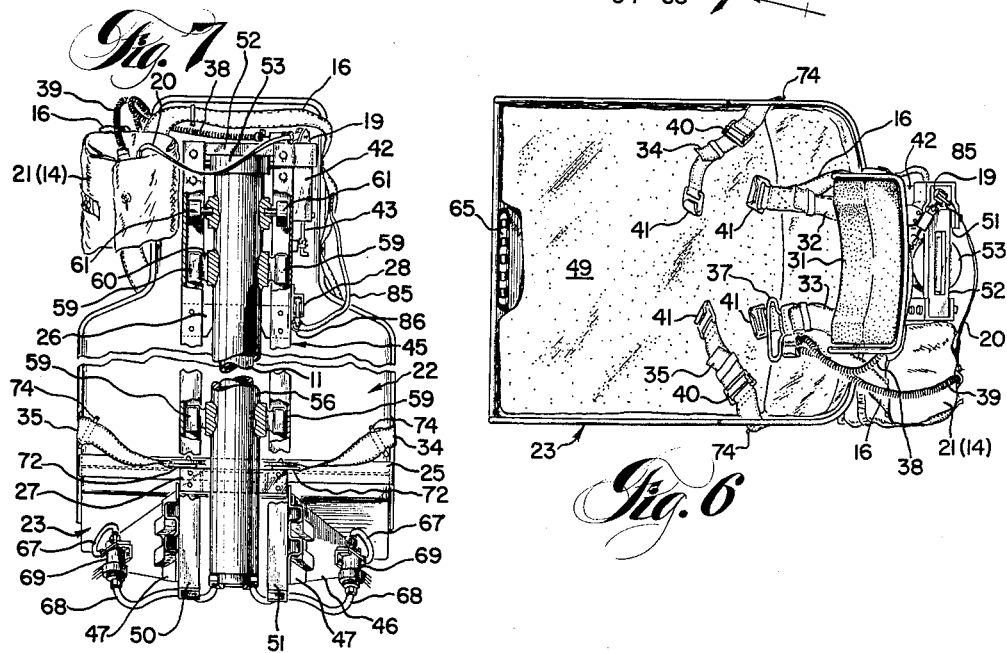

Feb. 6, 1962 D. W. BEEM ETAL 3,020,011
EJECTION SEAT
Filed July 21, 1960 3 Sheets-Sheet 3
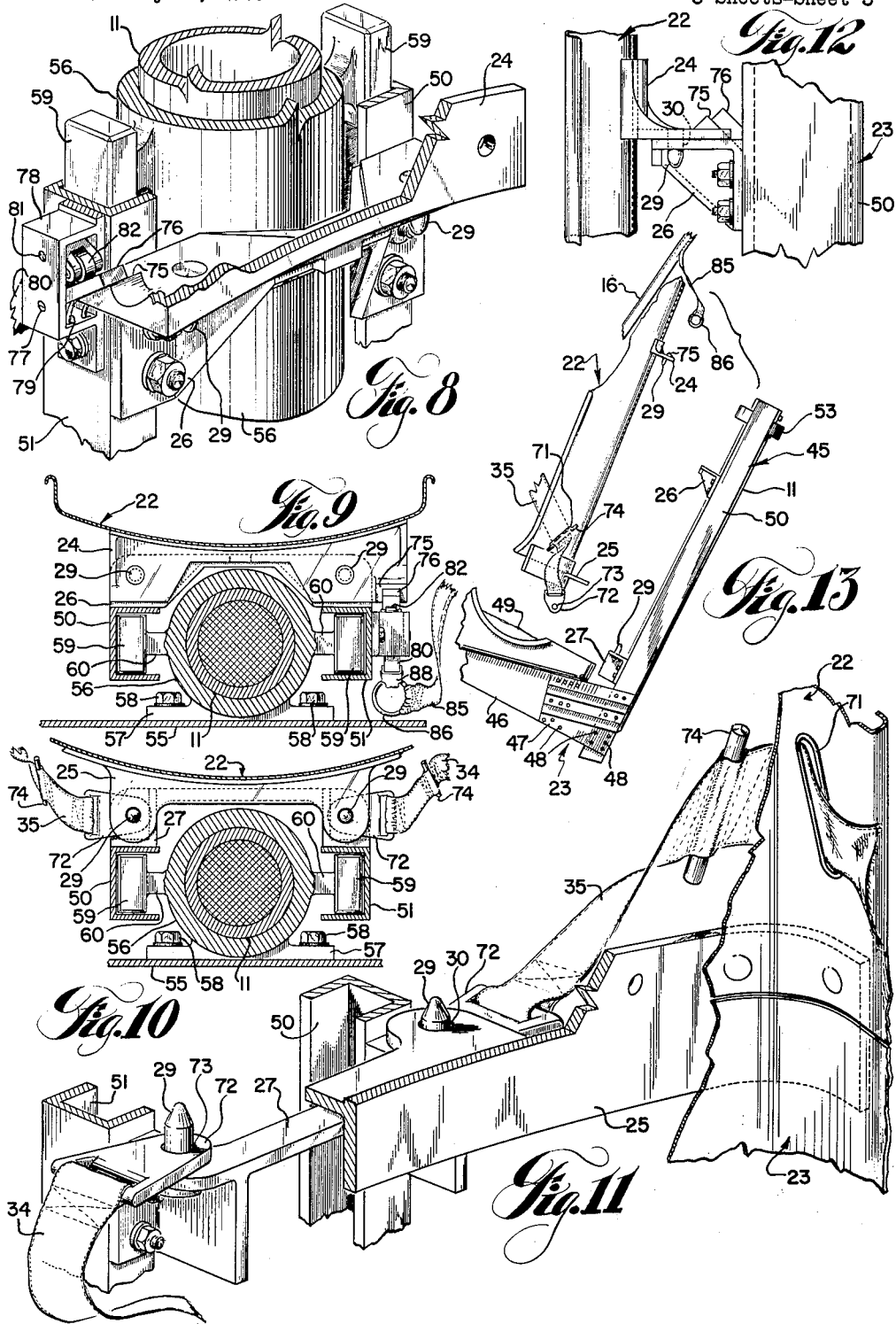

Patented Feb. 6, 1962

3,020,011
EJECTION SEAT
Donald W. Beem, Gahanna, and Frank H. Wallace, Columbus, Ohio, assignors to North American Aviation, Inc.
Filed July 21, 1960, Ser. No. 44,433
8 Claims. (Cl. 244—141)

This invention concerns an aircraft ejection seat having a new construction which effectively develops an improved emergency escape capability. The advantages and results obtained by this invention are especially sigificant with respect to personnel escape from an air vehicle in a danger situation which additionally involves reduced or zero air vehicle velocity and/or low or zero air vehicle altitude.

Aircraft ejection seat equipments provided in connection with modern aircraft to safely remove or transport operating personnel to ground level in an emergency situation typically utilize a let-down parachute means. Such parachute means is generally combined either with a personnel capsule or with a one-piece type ejection seat component, the seat occupant being restrained therein in a proper position. Such equipments have generally proved disadvantageous in that complete personnel mobility at the time of ground contact is prevented and the likelihood of injury to the seat occupant is increased. Other known items of ejection seat equipment have been developed to overcome such ground contact mobility problem and such other equipment generally relies upon occupant-seat separation at some pre-selected altitude. Constructions of the latter equipment have often proved inadequate for the reasons that deployment of the let-down parachute means is often physically impaired and, from the standpoint of a low-level, low-velocity escape situation, the time required for seat-man separation and subsequent parachute deployment is unnecessarily critical.

To overcome the disadvantages associated with known ejection seat equipments, we have invented a novel aircraft ejection seat which generally employs separable seat portions. The seat occupant is restrained by a comparatively light-weight seat back having the let-down parachute means connected thereto. Rigid support structure, guidance components, and the necessary rocket propulsion unit are incorporated into a separate seat bottom portion which is detachably connected to the seat back. At an optimum position in the emergency escape procedure, inherently present forces are utilized to achieve separation of the seat back and seat bottom portions. In this manner we are able to achieve an improved aircraft ejection seat escape capability at both low aircraft operating altitudes and low aircraft operating velocities, are able to minimize the time required for let-down parachute means deployment, are able to improve the mobility of the occupant at the time of ground contact, and are able to completely eliminate parachute deployment hazards which typically exist in connection with known occupant-ejection seat separation techniques.

Accordingly, it is an object of this invention to provide an aircraft ejection seat equipment arrangement which achieves an improved capability in connection with escape situations involving reduced aircraft velocities and minimum aircraft operating altitudes.

Another object of this invention is to provide an aircraft ejection seat which is effective to develop increased mobility for the seat occupant at the time of ground contact.

Another object of this invention is to provide an aircraft ejection seat having separable back and bottom portions with an improved means for releasing and detaching such portions at an optimum position in an escape procedure.

Another object of this invention is to provide an ejection seat which is effective to minimize the time requirement for let-down parachute means deployment.

A still further object of this invention is to provide an aircraft ejection seat equipment arrangement which has separable seat portions with an improved means for restraining the seat occupant therein during aircraft flight operations.

Another object of this invention is to provide improved aircraft ejection seats which are relatively light-weight, which are comparatively simple to manufacture and service, and which have good operational reliability.

Other objects and advantages of this invention will become apparent during consideration of the description and attached drawings.

In the drawings:

FIGS. 1 through 3 illustrate a preferred embodiment of the aircraft ejection seat of this invention at various positions in a typical emergency escape procedure;

FIGS. 4 through 7 are elevational and plan views of the aircraft ejection seat illustrated in FIGS. 1 through 3;

FIGS. 8 through 12 illustrate further details of the aircraft ejection seat shown in FIGS. 1 through 7;

FIG. 13 is an exploded elevational view of portions of the ejection seat of this invention showing means for restraining separable ejection seat back and bottom portions with respect to each other; and FIGS. 14 and 15 illustrate details of a release means for effecting separation of the separable seat portions employed in the practice of this invention.

FIG. 1 illustrates an aircraft ejection seat 10 having the features of this invention and being catapulted by rocket propulsion unit 11 from within the crew compartment 12 of airplane 13. In FIG. 1 the ejection seat of this invention is illustrated in a position of having completely cleared adjacent aircraft support structure during the initial portion of a typical emergency ejection escape procedure. FIGS. 2 and 3 illustrate the seat at further positions in the typical escape.

Ejection seat 10 includes a let-down parachute 14 which is attached to the seat by conventional shroud lines 15 and riser straps 16 (FIG. 3). Parachute 14 is illustrated in FIG. 2 in a partially deployed condition at a position in the escape trajectory subsequent to the position shown in FIG. 1. As noted therein, seat 10 includes ballistically deployed slug 19 which is secured to the canopy of parachute 14 by line means 20. Deployment slug 19 is fired from a gun device in connection with selectively automatic initiation of parachute deployment but it may be selectively severed from parachute 14 in the event conventional pilot parachute 17 is relied upon for manual initiation of parachute 14 deployment. Pilot parachute 17 is attached to the canopy of parachute 14 by the shroud lines designated 18. Parachute 14 and its attached shroud lines 15 are preferably carried on seat 10 within the attached casing designated 21. Such casing may employ a conventional closing means which is conducive to rapid, effective removal of parachute 14 by a relatively slight force.

In FIG. 3 the ejection seat of this invention is illustrated at a stage in the typical emergency escape procedure subsequent to FIG. 2. Essentially, FIG. 3 illustrates that stage of the ejection procedure whereat separable portions of seat 10 are disengaged to improve the mobility of the seat occupant for subsequent ground contact and to improve the likelihood of full parachute deployment an adequate period of time prior to ground contact. As disclosed therein, seat 10 has a seat back portion 22 and a separate bottom portion 23. Portions 22 and 23 of ejection seat 10 are detachably secured with respect to each other by seat back connector brackets 24 and 25, seat bottom connector brackets 26 and 27 (FIG.

13), and the release means designated 28. As shown in FIG. 13, connector brackets 24 and 27 are provided with projecting studs 29. Such studs cooperate with aligned openings 30 provided in each of connector brackets 25 and 26.

Further details regarding seat 10 are disclosed by FIGS. 4 through 7. Seat back 22 includes a head rest 31 and has the straps 32 through 35 attached thereto for securing the seat occupant to the seat in proper position. Straps 32 and 33 are secured to seat back 22 by slotted brackets 36 and have the parachute risers 16 secured thereto by any suitable means. An open, manual initiator ring 37 is carried by strap 33 for use in manually initiating deployment of parachute 14. Movement of ring 37 relative to strap 33 causes displacement of override cables 38 and 39 to: (1) detach parachute deployment slug 19 from parachute 14 and thereby free parachute 14 from restraint by the ballistic gun 42 included as a part of bottom 23 and (2) manually initiate deployment of pilot parachute 17. Additional details with respect to the operation of the manual override parachute release components will be provided hereinafter.

Strap members 34 and 35 are located at the lower extreme of seat back portion 22 and are provided with length adjustment means 40. The free end of each strap member 32 through 35 is provided with a hook device 41 for securing the seat occupant to that particular strap. In the preferred arrangement, hooks 41 are attached to a conventional harness suit (not shown) worn by the seat occupant. Additional description will be provided hereinafter with respect to a preferred means for securing straps 34 and 35 to rigid support structure and for releasing and limiting movement of strap members 34 and 35 relative to seat back 22 at the separation stage of the escape sequence trajectory. Also, survival equipment (not shown) may be secured to seat back portion 22 if survival problems are anticipated.

Separable seat bottom portion 23 is connected to seat back portion 22 by the above-described elements 24 through 30. Seat bottom 23 is comprised of a frame support 45, a seat pan 46 connected to frame support 45 by reinforced plates 47 and fasteners 48, and seat cushion 49. The upper, forward side extremes of seat pan 46 are extended upward beyond cushion 49 a sufficient distance to provide lateral restraint for the upper leg portions of the seat occupant during movement of the seat in an airstream in the emergency ejection sequence. Frame support 45 is essentially comprised of spaced-apart channel members 50 and 51 which are joined at the bottom by connector bracket 27 and connector bracket 26 and by the beam 52 that is secured to the head 53 of rocket propulsion unit 11. Suitable fastener devices are provided for joining elements 50, 51, 26, 27, and 52 together. See FIGS. 7, 8, and 11 through 13.

Channel members 50 and 51 cooperate with components attached to the structure of airplane 13 to guide the seat in a proper direction as it is being catapulted from within crew compartment 12. For this purpose suitable aircraft structure 55 (FIGS. 9 and 10) carries a guide tube 56 secured thereto by brackets 57 and fasteners 58. Guide tube 56 includes guide blocks 59 secured thereto by the webs designated 60. Guide blocks 59 cooperate with channel members 50 and 51, and rocket propulsion unit 11 is contained almost entirely within guide tube 56 in telescoping relation. The upper portion of guide tube 56 is provided with roller devices 61 (FIG. 7) to develop reduced friction during the seat catapulting operation. Such roller devices also cooperate with channel members 50 and 51.

Seat bottom 23, in addition to having rocket propulsion unit 11 attached thereto through beam member 52, is provided with a suitable means for initiating ignition of unit 11. Such means is essentially comprised of initiator handle 65, initiator cartridges 66, tube sections 67 and 68, and the quick-disconnect designated 69. Cartridges 66 are of conventional ballistic design, are mounted on seat pan 46, and have an actuating rod 70 for firing each such device. The free end of each rod 70 contains a roller element that cooperates with an inclined surface at the lower inner faces of handle 65. Referring to FIG. 4, as handle 65 is manually moved upwardly, each rod member 70 is moved toward the center of ejection seat 10 to thereby simultaneously fire each initiator cartridge 66 and produce a high-pressure gas charge. The gas charge is ported through tube sections 67, through disconnect devices 69, and into tube sections 68. High-pressure gas received in tube sections 68 from disconnect devices 69 is ported into a pressure-operated initiator device (not shown) located in rocket propulsion unit 11. Such propulsion unit, pressure-operated initiator device is preferably of conventional design and functions to ignite the propulsion charge of unit 11. Disconnect device 69 is secured to aircraft structure through the floor bracket designated 54. After high-pressure gas is received in the initiator of rocket propulsion unit 11 to thereby ignite the main propellant charge, the reaction forces developed by propulsion unit 11 are sufficient to catapult unit 11, seat bottom 23, seat back 22, and the seat occupant upwardly relative to guide tube 56 and aircraft support structure 55. As the ejection seat is so-moved, disconnect 69 and tube section 68 are separated from the seat and channel members 50 and 51 are moved relative to guide blocks 59 and rollers 61 to orient seat movement in a proper direction.

FIG. 7 illustrates gun unit 42 for deploying slug 19 and parachute 14 as having an initiator rod 43. Downward movement of rod 43 relative to the housing of unit 42 will cause ignition of a propellant charge contained in device 42. It is preferred that rod 43 be attached to aircraft structure in order that the deployment of parachute 14 might be achieved in an automatic manner. Any conventional connection can be provided for this purpose and accordingly no related showing is made in the drawings. In the event that manual or non-automatic deployment of parachute 14 becomes necessary, movement of handle 37 and attached cables 38 and 39 functions to detach line 20 from slug 19 and to deploy pilot parachute 17 from within casing 21.

Lower strap members 34 and 35 of seat back portion 22 are fixedly attached to rigid structural portions of ejection seat 10 when portions 22 and 23 are properly joined with respect to each other. Each such strap member passes through a slot 71 provided in seat back 22 and the end of each such strap member opposite a hook device 41 is attached to frame support 45 through an anchoring means such as tab 72 (FIG. 11). A slot in tab 72 cooperates with the strap extreme to achieve the interconnection between such elements. When assembling the seat components, the opening 73 in each tab cooperates with a stud 29 and is positioned between adjacent connector brackets 25 and 27. See FIG. 11. When the seat back and bottom portions are properly restrained with respect to each other, tabs 72 are completely restrained from movement relative to seat back portion 22 by frame support 45. However, when the seat back and bottom portions are separated from each other, as during the emergency ejection sequence, tabs 72 are released from restraint and attached straps 34 and 35 are released for limited movement relative to seat back 22. A pin element 74 is provided in each of strap members 34 and 35 to limit movement of that strap member relative to the seat back upon separation of the major seat portions. Pin 74 is made oversize with respect to slot 71 to provide the necessary limit means.

FIGS. 14 and 15 provide detailed showings with respect to a suitable release means for initiating separation of seat portions 22 and 23 at a proper or optimum time during a typical emergency escape sequence. Connector bracket 24 is provided with an oblique, flat surface portion 75. When the seat back and bottom portions are properly assembled, surface portion 75 contacts the flat under surface of the pivot bar 76 which is attached to channel member 51 and housing 78 by pin means 77. Pivot bar 76 is urged in a counterclockwise direction (FIG. 14) by spring member 79 when the seat components are properly assembled but is maintained in contacting relation to surface 75 by the release arm designated 80. Such arm is pivotally attached to channel member 51 through housing 78 and the pivot means designated 81. An overcenter roller member 82 is pivotally attached to release arm 80 by pivot means 83 and engages the upper surface of pivot bar 76. The overcenter arrangement which is preferred with respect to release arm 80 and pivot bar 76 is exaggerated in the showing of FIG. 14. However, in a practical design a force of not greater than approximately five pounds is utilized to rotate release arm 80 clockwise a sufficient degree whereby spring member 79 is permitted to rotate bar 76 in a counterclockwise direction. Release arm 80 is also provided with a stop portion 84 for contacting the upper surface of pivot bar 76 and with means for operably connecting the release means 28 to parachute 14. As shown in FIGS. 14 and 15, such connecting means consists of a strap 85 secured at one end to a parachute riser 16 and provided with a ring 86 at the opposite end thereof. Ring 86 cooperates with a slot 87 at the end of release arm 80 and is maintained in proper engagement by the yieldable retainer member 88. The assembled relation of the release means is best illustrated by FIG. 14.

During a typical escape trajectory sufficient forces are developed in the riser straps 16 when the canopy of parachute 14 first attains the degree of deployment shown in FIG. 2 to rotate release arm 80 in a clockwise direction to thereby permit movement of seat portions 22 and 23 relative to each other. Such can be achieved when the release means has been moved by riser 16, strap 85, and ring 86 to the position shown in FIG. 15. As noted therein, pivot bar 75 is urged counterclockwise a sufficient distance to permit displacement of bracket 24 relative to bracket 26 in a direction along the axis of stud 29 and opening 30. The parachute reaction force transmitted through riser member 16 is sufficient to displace retainer member 88 and completely withdraw ring 86 from within slot 87.

A typical ejection procedure for seat 10 is initiated by the occupant of the seat by moving handle 65 upwardly from its FIG. 4 position. After handle 65 has been raised a sufficient distance to move rod members 70 and to thereby ignite initiator cartridges 66, the propulsion charge in unit 11 is ignited and the rocket means will move seat 10 to the position shown in FIG. 1. FIG. 1 indicates that the overhead closure for crew compartment 12 has been independently removed prior to initiation of the ejection sequence for seat 10. However, an alternate seat arrangement having the features of this invention might employ a shattering device to facilitate movement of seat 10 through the compartment closure member without causing injury to the seat occupant.

Upward movement of seat back 22, seat bottom 23, and the seat occupant relative to tube 56, guide blocks 59, guide rollers 61, and the airplane is achieved by the reaction forces developed in rocket propulsion unit 11 as transmitted through frame support 45. The propellant charge contained in unit 11 is ignited through the action of the high-pressure gas charge developed in cartridges 66 and conducted to the initiator device (not shown) of unit 11 through tube sections 67 and 68 and through disconnect devices 69. In the preferred mode of seat operation, the free end of actuator rod 43 for gun 42 is attached to aircraft structure and is moved relative to gun 42 a sufficient distance to fire that unit as seat 10 clears all adjacent aircraft structure.

In such automatic let-down parachute deployment mode of seat operation, deployment slug 19 is hurled upward by ballistic gun 42 with a sufficient force whereby line means 20 operates to remove let-down parachute 14 from within casing 21 and subsequently develops a somewhat taut condition in shroud lines 15 as illustrated in FIG. 2. The unused pilot parachute 17 is carried by deployment slug 19 but in a manner whereby complete deployment of parachute 14 is not delayed. It is preferred that the propellant charge for ballistic gun 42, the mass of deployment slug 19, the deployment resistance of parachute 14, pilot parachute 17, and shroud means 15 be properly balanced in comparison to the quantity of propellant contained in rocket propulsion unit 11 whereby the seat position illustrated in FIG. 2 is achieved just shortly before the reaction lift forces developed in rocket propulsion unit 11 are ended.

Downward movement of seat 10 and its occupant relative to the air resistance developed at partially deployed let-down parachute 14 provides a sufficient force in parachute riser straps 16 to cause strap 86 and ring 85 to rotate release arm 80 relative to its pivot axis 81. When roller member 82 is moved by release arm 80 across its over-center position, spring member 79 rotates pivot bar 76 relative to the contact surface 75 contained in connector bracket 24. Further rotation of pivot bar 76 frees seat portions 22 and 23 for movement relative to each other. In the typical escape trajectory the weight of seat bottom 23 (which includes attached spent rocket propulsion unit 11) causes seat bottom portion 23 to drop relative to seat back portion 22 but only after the parachute designated 14 is properly partially deployed and after the rocket reaction forces are terminated. Seat back portion 22 is connected by straps 32 through 35 to the seat occupant and to riser straps 16 of let-down parachute 14. Relative movement between such seat portions is in a direction along the axis of stud members 29 and openings 30 contained in various of connector brackets 24 through 27. When the seat portions are disengaged the end portion of straps 34 and 35 having a tab 72 attached thereto are freed for limited movement relative to seat back 22. Such straps are freed to move relative to seat back 22 until pin elements 74 are restrained by the slots designated 71. In this manner the lower portion of the seat occupant's body is freed from restraint by the seat bottom (46) and from rigid restraint by seat back 22 to facilitate personal mobility for the landing operation.

It is to be understood that the forms of the invention herewith shown and described are to be taken as preferred embodiments of the same, but that various changes in the shape, size, and arrangement of parts may be resorted to without departing from the spirit of the invention or the scope of the subjoined claims.

We claim:

1. An aircraft ejection seat having, in combination: a seat bottom portion provided with an occupant support and with an attached rocket propulsion unit having a longitudinal axis, a separate seat back portion oriented generally parallel to said rocket propulsion unit longitudinal axis, let-down parachute means secured to said seat back portion, retention strap means attached to said seat back portion for restraining the seat occupant, engaged separable connector means connecting said seat back portion to said seat bottom portion, and release means restricting movement of said seat back portion relative to said seat bottom portion, said release means being operably connected to said let-down parachute means and freeing said seat bottom portion from restraint relative to said seat back portion when a drag force is applied to said release means by said let-down parachute means.

2. The ejection seat defined by claim 1, wherein said connector means includes a first element connected to said seat back portion and a separate second element connected to said seat bottom portion, said elements being engaged and disengaged with respect to each other only in a direction which is generally parallel to said rocket propulsion unit longitudinal axis.

3. The ejection seat defined by claim 1, wherein said release means includes an overcenter actuating arm element, said release means actuating arm element being operatively connected to said let-down parachute means and moved from an over-center position to free said seat bottom and back portions from restraint relative to each other when said let-down parachute means is deployed.

4. The ejection seat defined by claim 1, wherein said retention strap means is provided with an anchoring element at least at one end thereof, said anchoring element being detachably connected to said seat bottom portion.

5. The ejection seat defined by claim 4, wherein said strap means anchoring element is detachably connected to said seat bottom portion by cooperation with said connector means only when said separable connector means are engaged with each other.

6. An aircraft ejection seat which is comprised of: a structural frame having an attached seat pan means and an attached rocket propulsion unit, a separate seat back having let-down parachute means and occupant retention means each secured thereto, and connector means secured to said structural frame and to said seat back, said connector means including engaged separate first and second portions which are connected to said seat back and to said structural frame respectively, which are disengaged by relative movement with respect to each other in a direction generally normal to said seat pan means, and which are positioned with said connector means first portion located above said connector means second portion when the seat occupies a normally upright position.

7. The aircraft ejection seat defined in claim 6, wherein there is included a release means for restricting movement of said seat back relative to said structural frame, said release means having an actuator portion which is carried by said seat back and which is operatively connected to and moved by said let-down parachute means.

8. The aircraft ejection seat defined in claim 6, wherein said occupant retention means includes an anchoring element, said anchoring element being connected to said structural frame through said connector means only when said connector means first and second portions are engaged.

References Cited in the file of this patent

UNITED STATES PATENTS

| | | |
|---|---|---|
| 2,569,638 | Martin | Oct. 2, 1951 |
| 2,765,130 | Replogle et al. | Oct. 2, 1956 |
| 2,900,150 | Hirt et al. | Aug. 18, 1959 |